United States Patent
Bettels et al.

(10) Patent No.: US 11,214,440 B2
(45) Date of Patent: Jan. 4, 2022

(54) RECEIVING BIN FOR A SORTING MACHINE

(71) Applicant: Mettler-Toledo Garvens GmbH, Giesen (DE)

(72) Inventors: Dirk Bettels, Harsum (DE); Manuel Raulf, Giesen (DE)

(73) Assignee: Mettler-Toledo Garvens GmbH, Giesen (DE)

(*) Notice: Subject to any disclaimer, the term of this patent is extended or adjusted under 35 U.S.C. 154(b) by 0 days.

(21) Appl. No.: 17/155,489

(22) Filed: Jan. 22, 2021

(65) Prior Publication Data
US 2021/0229920 A1    Jul. 29, 2021

(30) Foreign Application Priority Data
Jan. 24, 2020 (EP) .................................. 20153547

(51) Int. Cl.
*B65G 11/20* (2006.01)
*B65G 11/08* (2006.01)

(52) U.S. Cl.
CPC ...... *B65G 11/20* (2013.01); *B65G 2201/0202* (2013.01); *B65G 2207/26* (2013.01)

(58) Field of Classification Search
CPC .......... B65G 11/08; B65G 11/20; B07C 13/16
USPC ...................... 193/2 R, 2 A, 14, 17
See application file for complete search history.

(56) References Cited

U.S. PATENT DOCUMENTS

| | | | | |
|---|---|---|---|---|
| 5,192,121 A | * | 3/1993 | Stutler | B65F 1/006 220/909 |
| 5,881,889 A | * | 3/1999 | Poulsen | B07C 5/362 209/657 |
| 6,799,684 B2 | * | 10/2004 | Wooldridge | B07C 5/38 209/551 |
| 7,600,643 B2 | | 10/2009 | Georgitsis et al. | |
| 8,528,721 B2 | * | 9/2013 | Eiserloh | B65G 47/647 198/360 |
| 9,617,063 B2 | * | 4/2017 | Schwanitz | B07B 13/16 |
| 9,962,743 B2 | * | 5/2018 | Bombaugh | B07C 3/02 |
| 10,577,194 B2 | * | 3/2020 | Stronkhorst | B65G 47/844 |
| 10,712,000 B2 | | 7/2020 | Ozeki et al. | |
| 10,814,355 B2 | * | 10/2020 | Kania | G01F 23/292 |

FOREIGN PATENT DOCUMENTS

FR    2813027 A1    2/2002

* cited by examiner

*Primary Examiner* — Douglas A Hess
(74) *Attorney, Agent, or Firm* — Standley Law Group LLP; Jeffrey S. Standley; Stephen L. Grant

(57) ABSTRACT

A receiving bin for a sorting machine is movable between an operative configuration and an inoperative configuration. In the operative configuration, the receiving bin is configurable for receiving a rejected product from the sorting machine. In an inoperative configuration, the receiving bin is configurable for servicing and maintenance. The receiving bin has an inlet chute, a transfer chute, and, optionally, a mechanism of altering the configuration connects the inlet chute and the transfer chute. In one arrangement, the inlet chute and the transfer chute are sufficiently exposed to a waterjet during a cleaning event, for maintaining aseptic conditions and a hygienic environment. This is especially useful the sorting machine is commissioned in a production plant where food items such as meat, fish, or dairy products are processed and packaged.

17 Claims, 4 Drawing Sheets

RECEIVING BIN FOR A SORTING MACHINE

CROSS-REFERENCE TO RELATED APPLICATIONS

This patent application claims priority to European application EP 20153547.3, filed on 24 Jan. 2020, which is incorporated by reference as if fully recited herein.

TECHNICAL FIELD

The invention concerns a sorting machine and more particularly a receiving bin for a sorting machine used for receiving non-conforming products from a batch of conveyed products. The receiving bin of the present invention is movable between an operative configuration and an inoperative configuration.

BACKGROUND ART

A sorting machine of the type known in the art automatically inspects a plurality of products for conformity and separates defective ones that do not conform with a predetermined set of specifications or standards. Sorting machines are employed in a variety of environments to carry out sorting operations. Typically, a sorting operation is an integral part of the food processing industry. Sorting is carried out for meat and fish products, dairy products such as cheese, agricultural products such as nuts etc. The sensitive nature of the products that the machines handle requires frequent cleaning of the components such as conveyor belts, ejection containers, receiving bins, etc., that could come in contact with the product that is processed. Cross contact with allergens could increase the risk of contamination many folds, thereby posing severe health risks to end consumers of the product.

The main problem associated with cleaning the sorting machines is the difficulty in gaining optimum access to conveyor belts, ejection containers, and receiving bins. This problem severely undermines the cleaning efforts of operators, giving rise to ever increasing infestation. In a typical sorting machine layout, the receiving bin is arranged in close proximity to the outfeed conveyor belt to ensure successfully transfer of rejected product from the outfeed conveyor belt directly into the receiving bin. For carrying out washing, the conveyor belt is loosened up before it is tilted upwards from the frame of the sorting machine. However, in addition to loosening up the belt it is also necessary to spatially move the receiving bin away from the conveyor. Specifically, the receiving bin should be moved out of the path of the outfeed conveyor belt because in its working position the receiving bin directly interferes with the outfeed conveyor belt. One known way in which the aforementioned requirement is presently addressed is by physically separating the receiving bin from the remaining parts, typically the frame, of the sorting machine and keeping it aside while the conveyor belts are moved into a desired position that enables increased access for carrying out cleaning operation. In another known way, the receiving bin is arranged to swivel about a vertical axis thereby moving the receiving bin out of the way of the conveyor belts.

The prior art arrangements pose severe challenges to the owners of processing plants as cleaning and sanitation of processing environment progressed from an afterthought to a central consideration in view of the ever increasing regulatory demands coupled with obligations to meet the global food safety standards. A dedicated storage space must be allocated within the processing plant for keeping the prior art receiving bin that is removed from the frame of the sorting machine until the cleaning operation is carried out and the equipment is dried sufficiently. Secondly, a typical receiving bin is heavy and requires suitable man-machine coordination to displace and relocate it thereby making the cleaning operation labour intensive and costly. The problem associated with the other known solution is the additional spacing that needs to be planned into the site layout for accommodating the receiving bin when it is swivelled about the frame. Secondly, the use of high pressure wash-down techniques for sanitizing the machines tends to cause accumulation of water in the swivelling connection located in between the receiving bin and the frame to obtain the desired swivelling effect. Entry of water into the joints could potentially lead to formation of rust. Use of lubrication for joints is forbidden in processing environment as it could be a source of contamination. The prior art receiving bin designs also pose severe problems in terms of offering the much needed exposure to high pressure wash-down operation. The integrally formed closed box design of the present day receiving bin makes it difficult for the operators to access the inner surfaces and forever keeps those inaccessible surfaces out of reach of the jet, thus making the receiving bin a breeding ground for pathogens and a sink for dirt, residues, and debris.

In view of the aforementioned disadvantages associated with prior art receiving bins, the applicant searched for a new solution that would allow the sorting machine to be equipped with a receiving bin that provides easy access to the operators for carrying out cleaning of the various components of the sorting machine that come in contact with the product that is to be processed. It occurred to the inventors that strict adherence to the regulatory guidelines and high conformity with the global food standards could be achieved in processing plants by means of an improved receiving bin.

SUMMARY

An object of the present invention is to provide a receiving bin for a sorting machine, particularly, a receiving bin that is movable to alternate between an operative configuration in which the receiving bin is configurable for receiving a rejected product from the sorting machine, and an inoperative configuration in which the receiving bin is configurable for servicing and maintenance. The receiving bin comprises an inlet chute and a transfer chute. Advantageously, the receiving bin for the sorting machine, according to the invention, further comprises a configuration altering mechanism connecting said inlet chute, and said transfer chute. The configuration altering mechanism comprises at least one first guiding member having a receiving position and a separating position; at least one first guided member receivable within the first guiding member; at least one second guiding member having a front end position and a rear end position located opposing the front end position, and at least one second guided member receivable within the second guiding member and configured to be continuously movable between the front end position and the rear end position. The receiving bin is in operative configuration when the first guided member is located in the receiving position of the first guiding member and the second guided member is located in the front end position of the second guiding member. The receiving bin is in inoperative configuration when the second guided member is located in the rear end position of the second guiding member and the first guided member is located outside of the first guiding member. The inventive arrangement offers several advantages and most notable among them is the easy access to conveyor belts for cleaning when the receiving bin is moved into an inoperative configuration. Besides, it is not necessary to separate the receiving bin from the frame of the sorting machine for the purpose of servicing and maintenance. In addition, the inlet chute and the transfer chute are sufficiently exposed to waterjet during a cleaning event, which is essential to maintain aseptic conditions and hygienic environment, especially when the sorting machine is commissioned in a production plant where food items such as meat, fish, cheese, or nuts are processed and packaged.

In the inventive arrangement, the configuration altering mechanism is located on the left hand side and right hand side of the receiving bin, when the receiving bin is disposed in an operative configuration. The terms left hand side and right hand side within the present context relate to the display of the sorting machine as it presents itself to an operator of the sorting machine when the sorting machine is in a working condition. The spatial directions and dimensions are accordingly defined as width, height and depth as seen by a person standing in front of such a display. The configuration altering mechanism enables the operator to move the receiving bin between an operative configuration and an inoperative configuration. By way of providing the configuration altering mechanism on both sides of the receiving bin, the load acting on the receiving bin, and particularly the inlet chute during the operation of the sorting machine is evenly distributed thereby lowering the incidence of failure. Additionally, the movement of the receiving bin between an operative configuration and an inoperative configuration is smoothened when the configuration altering mechanism supports the inlet chute from two opposing sides.

According to a preferred embodiment, the configuration altering mechanism further comprises at least a third guiding member having a common position with the at least one second guiding member. The common position provides entrance to the second guided member such that the inlet chute is separated from the transfer chute when the second guided member is passed through the third guiding member and fully moved outside the third guiding member. The aforesaid feature of separating the inlet chute from the transfer chute is advantageous in the event of service, repair, or replacement.

In a preferred embodiment of the present invention, the receiving bin consists of a reinforcing member provided in a region surrounding the second guiding member and the third guiding member. The reinforcing member, advantageously, adds strength to the overall structure of the receiving bin and minimizes the incidence of structural failure. In an advantageous embodiment, the first guiding member, the second guiding member, and the third guiding member are formed as slots on the receiving bin by way of removing the material. Adding a reinforcing member to the receiving bin compensates for the material removed and hence contributes to the structural integrity and durability of the receiving bin.

In an advantageous embodiment, the first guiding member consists of a separating position and a receiving position such that the receiving bin is in the operative configuration when the first guided member is located in the receiving position of the first guiding member. In one particular implementation, the receiving position is arcuate in configuration and is shaped to match the surface profile of the first guided member. In the same implementation, the separating position is configured as an open end through which the first guided member exits the first guiding member. The exit of guided member through the separating position initiates the transition of receiving bin from an operative configuration to an inoperative configuration.

In an inventive arrangement, the third guiding member is transversely connected to the second guiding member such that the second guided member is movable from the second guiding member into the third guiding member and then further along the third guiding member to the outside so as to separate the inlet chute from the transfer chute. The aforesaid feature of separating the inlet chute from the transfer chute is advantageous in the event of service, repair, or replacement.

Advantageously, the third guiding member comprises an inner end position and an outer end position such that the third guiding member is connected to the second guiding member at the inner end position. This arrangement of connecting the third guiding member to the second guiding member facilitates the movement of second guided member from the second guiding member into the third guiding member. The inlet chute is separated from the transfer chute when the second guided member reaches the outer end position.

In the preferred embodiment, the inlet chute further comprises a first handle for applying force in a direction away from the receiving bin so as to move the first guided member outside of the first guiding member. The inlet chute further comprises a second handle for applying force to the inlet chute to move the second guided member along and to the rear end position of the second guiding member and subsequently rotate the inlet chute about an axis formed by the second guided member so as to alternate the receiving bin into an inoperative configuration.

In the preferred embodiments of the receiving bin, the inlet chute and the transfer chute are connected together by the second guided member. The second guided member is continuously moveable within the second guiding member. The second guided member is movable between the front end position and the rear end position of the second guiding member. The inlet chute and the transfer chute remain connected to each other as long as the second guided member continues to remain positioned within the second guiding member.

Advantageously, the first guided member and the second guided member are located on the inlet chute. Correspondingly, the first guiding member, second guiding member, and the third guiding member are located on the transfer chute. Alternatively, the first guided member and the second guided member are located on the transfer chute and the first guiding member, second guiding member, and the third guiding member are located on the inlet chute. The first guided member and the first guiding member complement each other. Similarly, the second guided member and the second guiding member complement each other.

Preferably, the reinforcing member is located on the transfer chute or inlet chute in the region surrounding the second guiding member and the third guiding member.

In an advantageous embodiment, the first guiding member, the second guiding member, and the third guiding member are configured as slots. Correspondingly, the first guided member and the second guided member are configured as pins.

Preferably, a sorting machine is provided with a receiving bin containing the aforementioned features, functions, and advantages.

In a preferred way, a method for altering the configuration of a receiving bin is disclosed. In the instant method, the configuration of the receiving bin is altered from an operative configuration in which the receiving bin is configured for receiving a rejected product from a sorting machine into an inoperative configuration in which the receiving bin is configured for servicing and maintenance. The method involves the step of moving the inlet chute in the direction away from the transfer chute so as to move the first guided member outside of the first guiding member. Then moving the inlet chute further in the direction away from the transfer chute so as to move the second guided member within the second guiding member until the second guided member reaches the rear end position of the second guiding member. Finally, rotating the inlet chute about an axis formed by the second guided member so as to finally move the receiving bin into the inoperative configuration.

Preferably, the method further contains steps through which the configuration of the receiving bin is altered from an operative configuration to a dismounted configuration. In an operative configuration, the receiving bin is configured for receiving a rejected product from a sorting machine. On the contrary, when the receiving bin is in a dismounted configuration, the inlet chute of the receiving bin is dismounted from the transfer chute for servicing, maintenance, and replacement. Specifically, the method involves the steps of moving the inlet chute in the direction away from the transfer chute so as to move the first guided member outside the first guiding member. Subsequently, the inlet chute is separated from the transfer chute by passing the second guided member through the third guiding member and moving the second guided member fully outside the third guiding member.

Advantageously, the method involves a step in which the inlet chute is moved in the direction away from the sorting machine by applying force on the first handle for pulling the inlet chute.

In a preferred manner, the method further contains a step in which the inlet chute is rotated about the axis formed by the second guided member by applying force on the second handle for rotating the inlet chute.

BRIEF DESCRIPTION OF DRAWINGS

In the drawings, identical parts are identified by identical part numbers and.

DETAILED DESCRIPTION OF THE EMBODIMENTS

Figure 1:
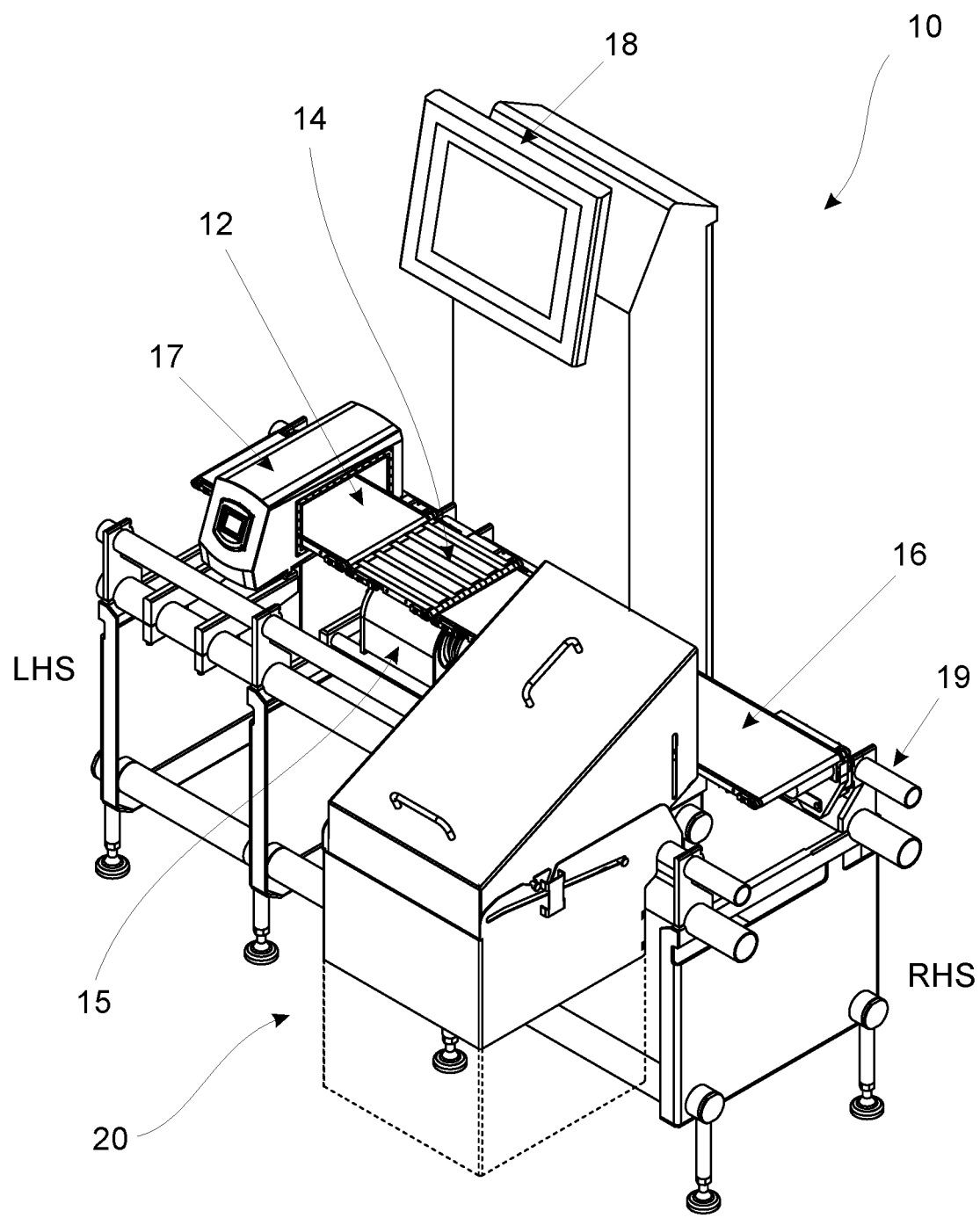
FIG. 1 shows a sorting machine with a receiving bin for receiving products rejected by the sorting machine.

FIG. 1 illustrates a sorting machine 10 according to the invention in perspective. The high level components of the sorting machine 10 are infeed conveyor 12, weighing conveyor 14, outfeed conveyor 16, detector 17, display 18, frame 19, and receiving bin 20. The infeed conveyor 12, the weighing conveyor 14, and the outfeed conveyor 16 are supported on the frame 19 and extend in the length wise direction of the frame 19. The infeed conveyor 12, the weighing conveyor 14, and the outfeed conveyor 16 are arranged in-line so as to seamlessly move a product from an infeed end on the left hand side (LHS) to an outfeed end of the sorting machine 10 on the right hand side (RHS). Here, the detector 17 is a metal detector capable of detecting any contaminants in the product, particularly contaminants such as very small metallic pieces. The detector 17 may in turn be a scanner which is equipped with state of the art optical systems such as cameras with which every product that is launched at the infeed end is inspected for quality and consistency. In an exemplary embodiment, the detector 17 is arranged above the infeed conveyor 12 and surrounding it so as to let the infeed conveyor 12 pass through it. The weighing conveyor 14 positioned in line with the infeed conveyor 12 is mechanically connected to the weighing system (15) arranged beneath the weighing conveyor 14. The weighing system (15) acting in combination with the weighing conveyor 14 determines the weight of the product and the resulting information is processed and analyzed instantaneously before the product is moved on to the outfeed conveyor 16. The analyzed data is presented to the operator using the display 18. The products that conform to the predetermined standards (weight, for instance) continue their passage along the outfeed conveyor 16 and are finally delivered for packaging or containerization. The products that fail to conform to the predetermined standards are removed or diverted from the outfeed conveyor 16 and moved into the receiving bin 20 to be collected later on by the operator for re-examination or quality control.

Figure 2:
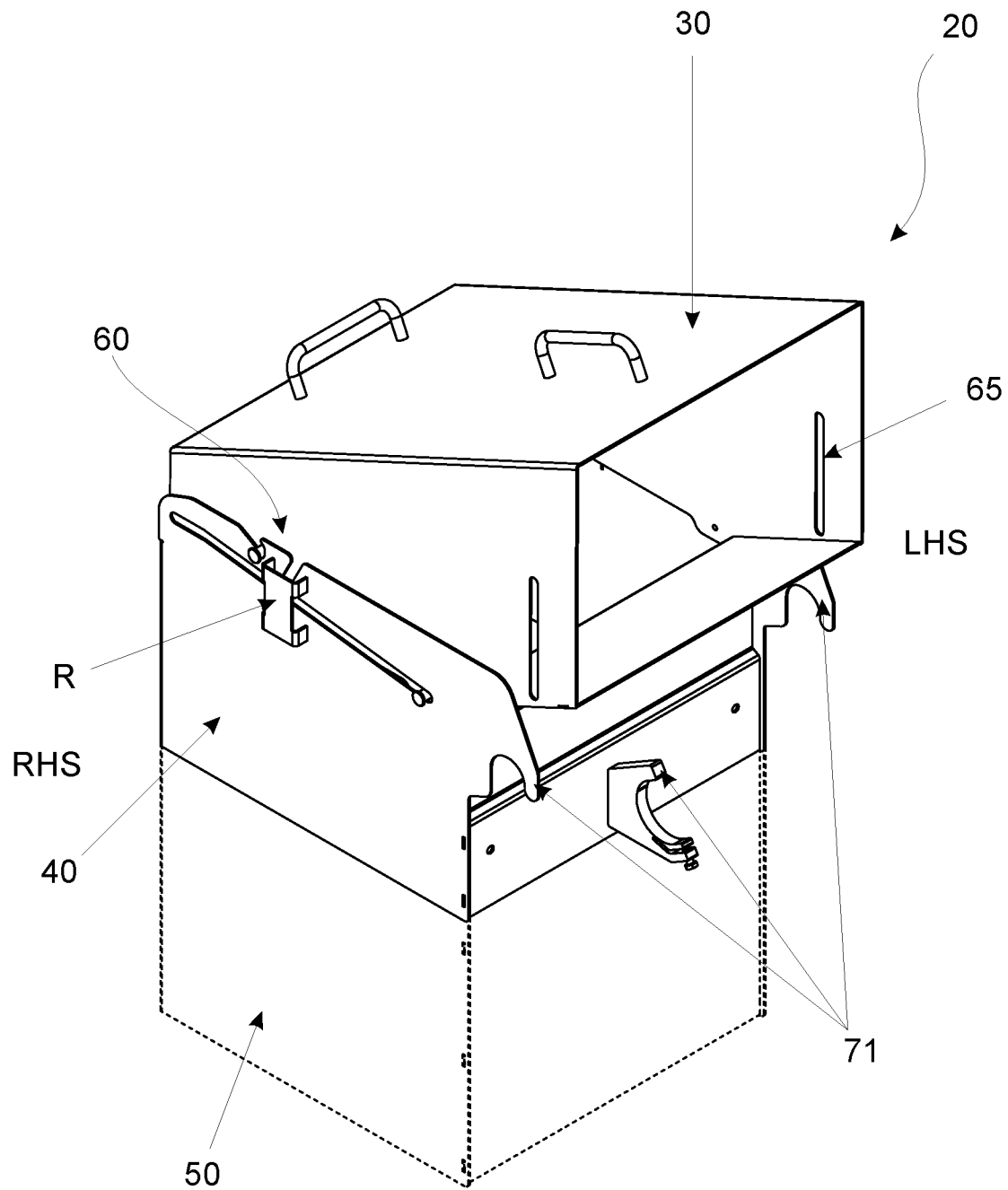
FIG. 2 is a perspective view of the receiving bin, arranged in an operative configuration.

FIG. 2 shows a receiving bin 20 by itself in its operative configuration, in which an inlet chute 30, a transfer chute 40, and a holding bin 50 are connected together. Mounting members 71 provided on the transfer chute 40 aid in attaching the receiving bin 20 to the frame 19. Slots 65 are provided on the inlet chute 30 to allow passage of pertinent optical signals, such as a light beam, laser beam or infrared radiation, for the purpose of sensing, counting, or detection. The receiving bin 20 further contains a configuration altering mechanism 60 that primarily connects the inlet chute 30 and the transfer chute 40. In the present embodiment, a reinforcing member R is added to the transfer chute 40, preferably in close proximity to the configuration altering mechanism 60, for the purpose of strengthening the body of the transfer chute 40.

Figure 3A:
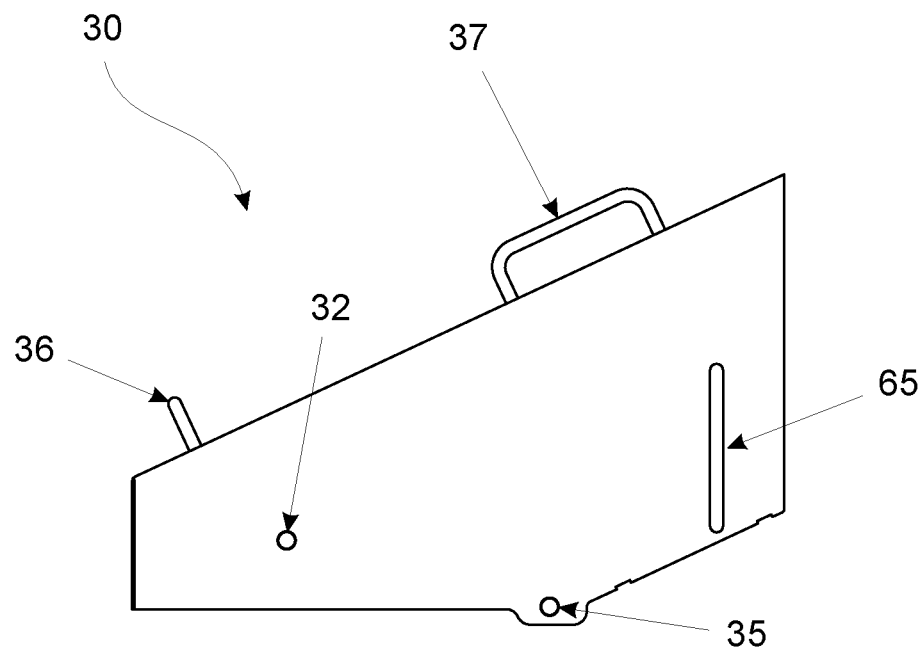
FIG. 3A is an exploded side view of an inlet chute of the receiving bin.
Figure 3B:
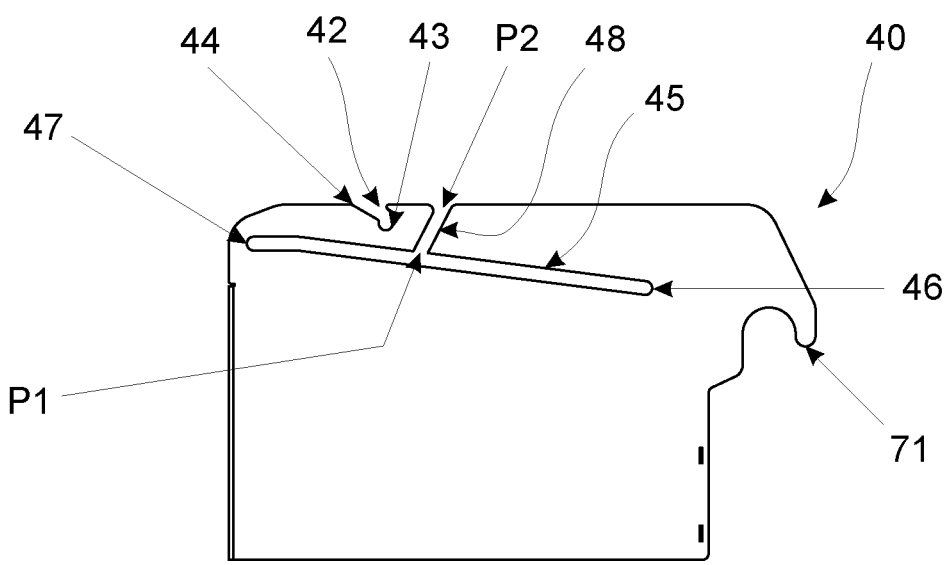
FIG. 3B is an exploded side view of a transfer chute of the receiving bin.

FIGS. 3A and 3B show the receiving bin 20 of FIG. 2 in its dismounted configuration with the inlet chute 30 in FIG. 3A separated from the transfer chute 40 in FIG. 3B. FIG. 3A and FIG. 3B further show details about the configuration altering mechanism 60. The configuration altering mechanism 60 of the present embodiment comprises a first guided member 32 and a second guided member 35 arranged on the inlet chute 30, a first guiding member 42 and a second guiding member 45 provided on the transfer chute 40. In the present embodiment, the first guided member 32 and the second guided member 35 are envisaged as pins. The first guiding member 42 and the second guiding member 45 are envisaged as slots that cooperate respectively with the first guided member 32 and the second guided member 35 both of which are configured as pins. The first guiding member 42 and the second guiding member 45 are uniquely configured to make them expedient for the smooth operation of the configuration altering mechanism 60. The first guiding member 42 comprises a receiving position 43 and a separating position 44, which in a way represents the position that the first guided member 32, in the form of a pin takes within the first guiding member 42, configured as a slot. The receiving position 43 is the closed end and the separating position 44 is the open end respectively of the first guiding member 42. On the other hand, the second guiding member 45 comprises a front end position 46 and a rear end position 47 located opposing the front end position 46. In the present embodiment, the front end position 46 and the rear end position 47 represent two extreme ends of the second guiding member 45 between which the second guided member 35 moves. This drawing further illustrates a third guiding member 48 that is transversely connected to the second guiding member 45. The third guiding member 48 is envisaged as a slot provided on the transfer chute 40 and comprising an inner end position P1 and an outer end position P2. The third guiding member 48 is transversely connected to the second guiding member 45 at its inner end position P1. The outer end position P2 is located opposing the inner end position P1. The third guiding member 48 connected transversely to the second guiding member 45 at its inner end position P1 enables the second guided member 35 to be movable from the second guiding member 45 into the third guiding member 48 and then further along the third guiding member 48 towards its outer end position P2 until the second guided member 35 exits the third guiding member 48 thus separating the inlet chute 30 from the transfer chute 40 thereby altering the receiving bin 20 from an operative configuration in to a dismounted configuration. The reinforcing member R is not shown in FIG. 3B for the purpose of brining more visibility to the third guiding member 48 and its relationship with the second guiding member 45. As is evident from FIG. 2, the reinforcing member R can remain located in its position on the transfer chute 40 while the second guided member 35 is routed through the third guiding member 48. The inlet chute 30 is provided with a first handle 36 for pulling the inlet chute 30 and a second handle 37 for rotating the inlet chute 30. These handles improve the ergonomics of moving the receiving bin 20 from an operative configuration to an inoperative configuration and vice versa.

Figure 4B:
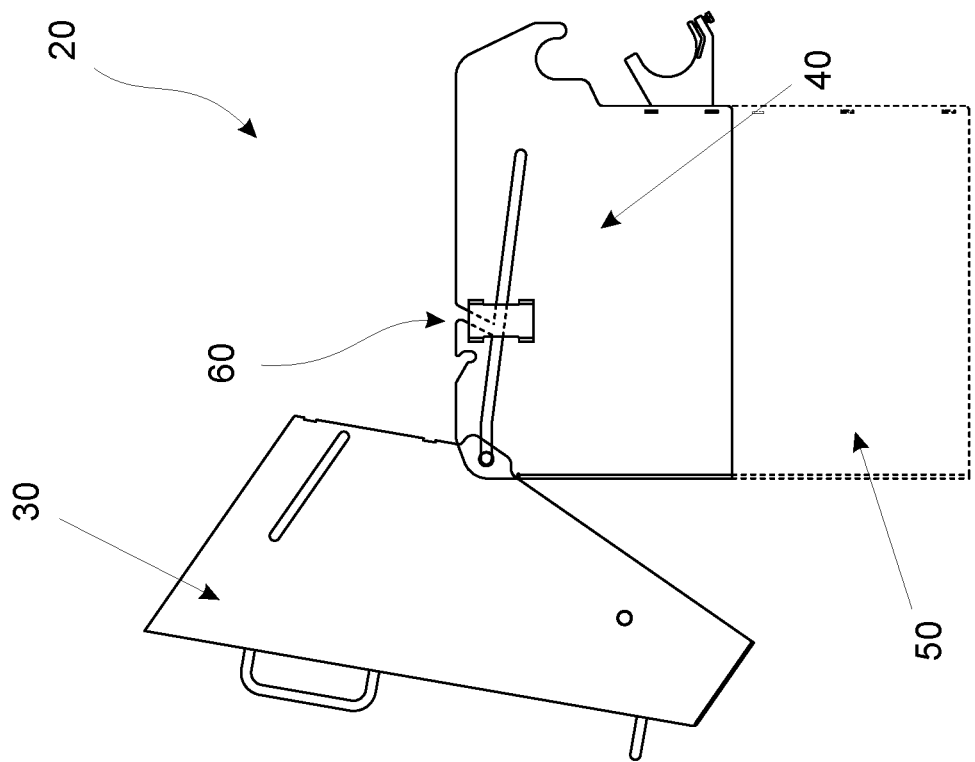
FIG. 4B is a side view of the receiving bin, arranged in an inoperative configuration
Figure 4A:
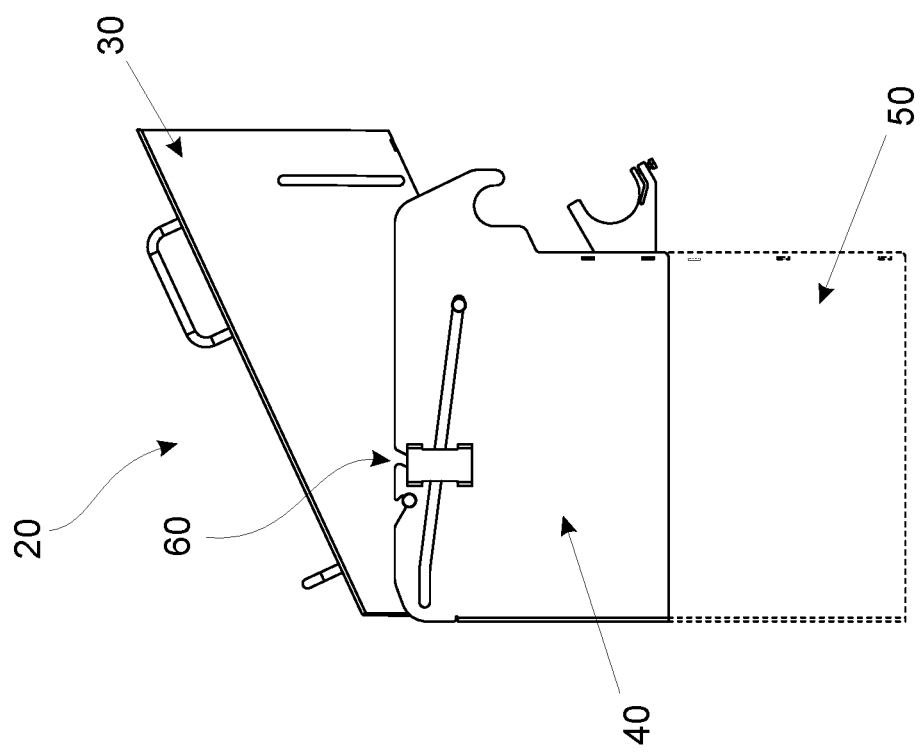
FIG. 4A is a side view of the receiving bin, arranged in an operative configuration.

FIGS. 4A and 4B illustrate a method for altering the configuration of the receiving bin 20, particularly, from an operative configuration to an inoperative configuration. In an operative configuration, the receiving bin 20 as indicated in FIG. 4A is set to successfully receive a rejected product from the sorting machine 10 (illustrated in FIG. 1). While in the inoperative configuration, the receiving bin 20 as shown in FIG. 4B is set up for carrying out servicing and maintenance. Firstly, the inlet chute 30, which is in an operative configuration as shown in FIG. 4A, is moved in the direction away from the transfer chute 40, which in turn leads to the movement of the first guided member 32 outside the first guiding member 42. Thereafter, the inlet chute 30 is moved further in the direction away from the transfer chute 40, which leads to the movement of the second guided member 35 within the second guiding member 45 until the second guided member 35 reaches the rear end position 47 of the second guiding member 45. Finally, the inlet chute 30 is rotated about an axis formed by the second guided member 35. Upon rotating the inlet chute 30 completely about the available angular span, the receiving bin 20 is fully moved into an inoperative configuration as shown in FIG. 4B. Beyond the operative and inoperative configurations, it is also possible to alter the configuration of the receiving bin 20 from an operative configuration in to a dismounted configuration, as shown in FIG. 3A and FIG. 3B, by first moving the inlet chute 30 in the direction away from the transfer chute 40 so as to move the first guided member 32 outside of the first guiding member 42. Then, separating the inlet chute 30 from the transfer chute 40 by passing the second guided member 35 through the third guiding member 48 and moving the second guided member 35 fully outside the third guiding member 48.

While the invention has been described through the presentation of a specific embodiment of a receiving bin, it is considered self-evident that numerous additional variants are encompassed by the teachings of the present invention. It is envisaged to use the teachings of the present invention and carry out predictable modifications that does not alter the underlying functionality. One such modification is to arrange the first guided member and the second guided member on the transfer chute and provide the first guiding member and the second guiding member on the inlet chute. It is also envisaged to partially or fully motorize the pulling effect and rotating effect of the inlet chute by using a resilient member or a servo motor, respectively. Such variants of the present concept described and claimed herein are considered without exception to fall within the scope of protection that is here by sought for the present invention.

REFERENCE SIGNS LIST 10 sorting machine
12 infeed conveyor
14 weighing conveyor
15 weighing system
16 outfeed conveyor
17 detector
18 display
19 frame
20 receiving bin
30 inlet chute
32 first guided member
35 second guided member
36 first handle for pulling the inlet chute (30)
37 second handle for rotating the inlet chute (30)
40 transfer chute
42 first guiding member
43 receiving position
44 separating position
45 second guiding member
46 front end position
47 rear end position
48 third guiding member
450 holding bin
60 configuration altering mechanism
62 slot
71 mounting members for frame (19)
P1 inner end position; common position for second guiding member (45) and third guiding member (48)
P2 outer end position
R reinforcing member

What is claimed is:
1. A receiving bin for receiving a rejected product from a sorting machine when in an operative configuration and for being serviced and maintained when in an inoperative configuration, the receiving bin comprising:
an inlet chute;
a transfer chute and
a mechanism for changing the configuration from the operative configuration to the inoperative configuration and vice versa, wherein the mechanism connects the inlet chute to the transfer chute and comprises:

a first guiding member with a receiving position and a separating position, and a first guided member, such that the first guided member is receivable within the first guiding member;

a second guiding member with a front end position and an opposing rear end position, and a second guided member, such that the second guided member is receivable within the second guiding member and is configured to be continuously movable between the front end position and the rear end position;

wherein the operative configuration is achieved when:
the first guided member is in the receiving position of the first guiding member; and
the second guided member is in the front end position of second guiding member; and wherein the inoperative configuration is achieved when:
the second guided member is located in the rear end position of the second guiding member; and
the first guided member is located outside of the first guiding member.

2. The receiving bin of claim 1, wherein the configuration-altering mechanism is located on each side of the receiving bin when the receiving bin is disposed in the operative configuration.

3. The receiving bin of claim 1, further comprising:
as a part of the configuration-altering mechanism, a third guiding member that has a common position with the second guiding member, the common position providing entrance to the second guided member, such that the inlet chute and transfer chute separate from each other when the second guided member passes through, and moves fully outside, the third guiding member.

4. The receiving bin of claim 3, further comprising:
a reinforcing member, arranged in the proximity of the second guiding member and the third guiding member.

5. The receiving bin of claim 3, wherein:
the third guiding member is connected transversely to the second guiding member, such that the second guided member is movable from the second guiding member into, and then further along, the third guiding member to the outside, separating the inlet chute from the transfer chute.

6. The receiving bin of claim 3, wherein the third guiding member has an inner end position and an outer end position, such that the third guiding member is connected to the second guiding member at the inner end position.

7. The receiving bin of claim 3, wherein:
the first guided member and the second guided member are located on the inlet chute; and
the first guiding member, the second guiding member, and the third guiding member are located on the transfer chute;
in that the first guided member and the second guided member are located on the transfer chute and the first guiding member, second guiding member, and the third guiding member are located on the inlet chute.

8. The receiving bin of claim 3, wherein:
the first guided member and the second guided member are located on the transfer chute; and
the first guiding member, second guiding member, and the third guiding member are located on the inlet chute.

9. The receiving bin of claim 3, wherein:
the first, second and third guiding members are configured as slots; and
the first and second guided members are configured as pins.

10. The receiving bin of claim 1, wherein the second guided member is continuously moveable within the second guiding member and connects the inlet chute and the transfer chute together.

11. The receiving bin of claim 1, further comprising:
a first handle, on the inlet chute, for applying a force in a direction away from the receiving bin, thereby moving the first guided member outside of the first guiding member; and
a second handle, also on the inlet chute, for applying a force to the inlet chute to move the second guided member along the second guiding member to rear end position thereof and for subsequently rotating the inlet chute about an axis formed by the second guided member, moving the receiving bin into the inoperative configuration.

12. A sorting machine, comprising a receiving bin according to claim 1.

13. A method for altering a receiving bin according to claim 1 from the operative configuration, in which the receiving bin receives a rejected product from a sorting machine, into the inoperative configuration for maintenance and servicing, the method comprising the steps of:
moving the inlet chute of the receiving bin in a direction away from the transfer chute of the receiving bin, such that the first guided member is moved outside of the first guiding member;
moving the inlet chute further in the direction away from the transfer chute, so that the second guided member, within the second guiding member, reaches the rear end position of the second guiding member; and
rotating the inlet chute about an axis defined by the second guided member to separate the inlet chute from the transfer chute, placing the receiving bin into the inoperative configuration.

14. The method of claim 13, wherein the step of rotating the inlet chute about the axis formed by the second guided member is achieved by applying a force on a second handle of the inlet chute for rotating the inlet chute.

15. The method of claim 13, wherein the step of moving the inlet chute in the direction away from transfer chute is achieved by applying a force on a first handle of the inlet chute.

16. A method for altering a receiving bin according to claim 1 from the operative configuration, in which the receiving bin receives a rejected product from a sorting machine, into the inoperative configuration for maintenance and servicing, the method comprising the steps of:
moving the inlet chute of the receiving bin in a direction away from the transfer chute of the receiving bin, such that the first guided member is moved outside of the first guiding member; and
passing the second guided member through, and outside of, a third guiding member, such that the inlet chute is dismounted from the transfer chute, into the inoperative configuration for servicing and maintenance.

17. The method of claim 16, wherein the step of moving the inlet chute in the direction away from transfer chute is achieved by applying a force on a first handle of the inlet chute.

* * * * *